United States Patent
McCallum

(10) Patent No.: US 10,397,206 B2
(45) Date of Patent: Aug. 27, 2019

(54) SYMMETRIC ENCRYPTION KEY GENERATION/DISTRIBUTION

(71) Applicant: Red Hat, Inc., Raleigh, NC (US)

(72) Inventor: Nathaniel McCallum, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 89 days.

(21) Appl. No.: 15/010,947

(22) Filed: Jan. 29, 2016

(65) Prior Publication Data

US 2017/0214670 A1    Jul. 27, 2017

Related U.S. Application Data

(60) Provisional application No. 62/287,185, filed on Jan. 26, 2016.

(51) Int. Cl.
*H04L 29/06* (2006.01)
*H04L 9/08* (2006.01)

(52) U.S. Cl.
CPC .......... *H04L 63/062* (2013.01); *H04L 9/0841* (2013.01); *H04L 63/045* (2013.01); *H04L 63/061* (2013.01)

(58) Field of Classification Search
CPC .... H04L 63/062; H04L 63/061; H04L 63/045
See application file for complete search history.

(56) References Cited

U.S. PATENT DOCUMENTS

| | | | | | |
|---|---|---|---|---|---|
| 5,214,702 | A | * | 5/1993 | Fischer | G06F 21/00 380/30 |
| 5,261,002 | A | * | 11/1993 | Perlman | H04L 9/3263 380/30 |
| 5,761,305 | A | * | 6/1998 | Vanstone | H04L 9/0844 380/285 |
| 5,887,063 | A | * | 3/1999 | Varadharajan | H04L 63/0492 713/172 |
| 6,105,134 | A | * | 8/2000 | Pinder | H04L 63/04 348/E5.004 |
| 6,901,510 | B1 | * | 5/2005 | Srivastava | H04L 9/0836 713/163 |

(Continued)

OTHER PUBLICATIONS

Majumdar, "On End-to-end Encryption for Cloud-Based Services", Sep. 2014, Concordia Institute for Information Systems Engineering, Concordia University Montreal, Quebec, Canada, excerpt from http://users.encs.concordia.ca/~mmannan/student-resources/Thesis-MASc-Majumdar-2014.pdf (85 pages).

(Continued)

*Primary Examiner* — Ellen Tran
(74) *Attorney, Agent, or Firm* — K&L Gates LLP

(57) ABSTRACT

Various examples are directed to systems and methods for exchanging encrypted information. A first computing device may select a first private key and generate a session key based at least in part on the first private key. The first computing device may receive from a second computing device a second public key and generate a first public key based at least in part on: the second public key, a shared secret integer, and the first private key. A second computing device may select a second private key and generate the second public key based at least in part on the second private key; a generator, a first group constant and the shared secret integer.

20 Claims, 4 Drawing Sheets

(56) References Cited

U.S. PATENT DOCUMENTS

| | | | |
|---|---|---|---|
| 7,076,656 | B2 | 7/2006 | MacKenzie |
| 8,422,670 | B2 | 4/2013 | Shin et al. |
| 8,443,194 | B2 | 5/2013 | Liu et al. |
| 8,621,227 | B2 | 12/2013 | Barton et al. |
| 8,972,731 | B2 | 3/2015 | Brown et al. |
| 2003/0005035 | A1 | 1/2003 | Rodgers |
| 2004/0073795 | A1 | 4/2004 | Jablon |
| 2010/0046757 | A1* | 2/2010 | Dancer .................. H04L 51/30 380/277 |
| 2011/0137920 | A1 | 6/2011 | Cohen et al. |
| 2012/0046050 | A1 | 2/2012 | Hymel et al. |
| 2012/0117167 | A1 | 5/2012 | Sadja et al. |
| 2012/0323938 | A1 | 12/2012 | Skeen et al. |

OTHER PUBLICATIONS

Diffie-Hellman, excerpt from http://www.tech-faq.com/diffie-hellman.html (6 pages).

Kolte et al., "An Efficient Password Security Mechanism Using Two Server Authentication and Key Exchange", Jan. 2015, Dept. of Information Tech NMIET Pune, India, excerpt from http://www.ijarcsms.com/docs/paper/volume3/issue1/V3I1-0020.pdf (4 pages).

Netsajeva, "Diffie-Hellman Key Exchange Essay", 2009, excerpt from https://www.google.com/url?sa=t&rct=j&q=&esrc=s&source=web&cd=3&cad=rja&uact=8&ved=0CCsQFjAC&url=http%3A%2F%2Fhome.cyber.ee%2Fahtbu%2FCDS2011%2FSandraNetsajevaSlides.doc&ei=m6tmVfjRGcuMuAS5zlHgBg&usg=AFQjCNFXlaOvil1vtete4Z2jVmhVhMjLyw&bvm=bv.93990622,d.c2E (19 pages).

McCallum, Spake Pre-Authentication, excerpt from https://www.google.com/url?sa=t&rct=j&q=&esrc=s&source=web&cd=9&cad=rja&uact=8&ved=0CFIQFjAI&url=http%3A%2F%2Fwww.ietf.org%2Fid%2Fdraft-mccallum-kitten-krb-spake-preauth-00.xml&el=m6tmVfjRGcuMuAS5zlHgBg&usg=AFQjCNHj3XXmUCcdtgJPw2c5qx2lf7zTxg&bvm=bv.93990622,d.c2E (4 pages).

Yi et al., "ID-Based Two-Server Password-Authenticated Key Echange" 2014, Lecture Notes in Computer Science, vol. 8713, excerpt from http://link.springer.com/chapter/10.1007%2F978-3-319-11212-1_15.

\* cited by examiner

SYMMETRIC ENCRYPTION KEY GENERATION/DISTRIBUTION

CROSS-REFERENCE TO RELATED APPLICATION

This application is a non-provisional of U.S. Patent Application Ser. No. 62/287,185, filed Jan. 26, 2016, the entire disclosure of which is hereby incorporated by reference herein.

BACKGROUND

According to symmetric encryption, computing devices that are parties to a transaction utilize a common encryption key, sometimes referred to as a session key. A first party encrypts a message with the session key, creating an encrypted first message. The first party sends the encrypted first message to a second party. The second party decrypts the encrypted first message with the session key. To prevent unauthorized parties from decrypting and reading the messages, the session key is kept secret. In order to implement symmetric encryption, however, both the first party and the second party must securely obtain copies of the session key.

SUMMARY

Various examples are directed to systems and methods for exchanging an encrypted message. A first computing device may be programmed to select a first private key, generate a session key, and generate a first public key. The first computing device may send the first public key to a second computing device. The second computing device may be programmed to select a second private key and generate a second public key. The second computing device may receive the first public key from the first computing device and generate the session key from the first public key and the second private key.

FIGURES

Various examples are described herein in conjunction with the following figures, wherein.

DESCRIPTION

Various examples are directed to systems and methods for public key encryption technology that utilizes a shared secret to reduce the risk of man-in-the-middle attacks and also allows a message to be encrypted with a common symmetric key, referred to herein as a session key, before communication between first and second parties to the transaction begins. For example, a first party to a public key encryption transaction can have confidence that messages are received from the same second party throughout the transaction if those messages can be decrypted by the same public key. By itself, however, public key encryption does not provide any authentication of the second party. This means that public key encryption can be vulnerable to man-in-the-middle attacks where an attacker impersonates one or both of the parties to a transaction and intercepts the messages between the two. Various examples described herein may reduce the risk of man-in-the-middle attacks by allowing the parties generate various keys from a shared secret. The shared secret may be a value, such as an integer, known to both parties. Although the common symmetric key is referred to herein as a session key, it may be used for a single communication session or multiple communication sessions, in various examples.

Also, for example, public key encryption techniques typically require an initial exchange of public keys between the parties before encrypted communications can begin. For example, the parties may exchange public keys. The parties may then utilize their public/private key pairs to send or generate a session key that is used to encrypt messages. In various examples, however, one party may derive the session key before communicating with the other party. In this way, the deriving party may encrypt messages before communicating with the second party. For example, the decrypting party may need to communicate with the deriving party only at the time that it is to decrypt a message and not necessarily at the time that the common key is derived or the message is encrypted or sent.

Figure 1:
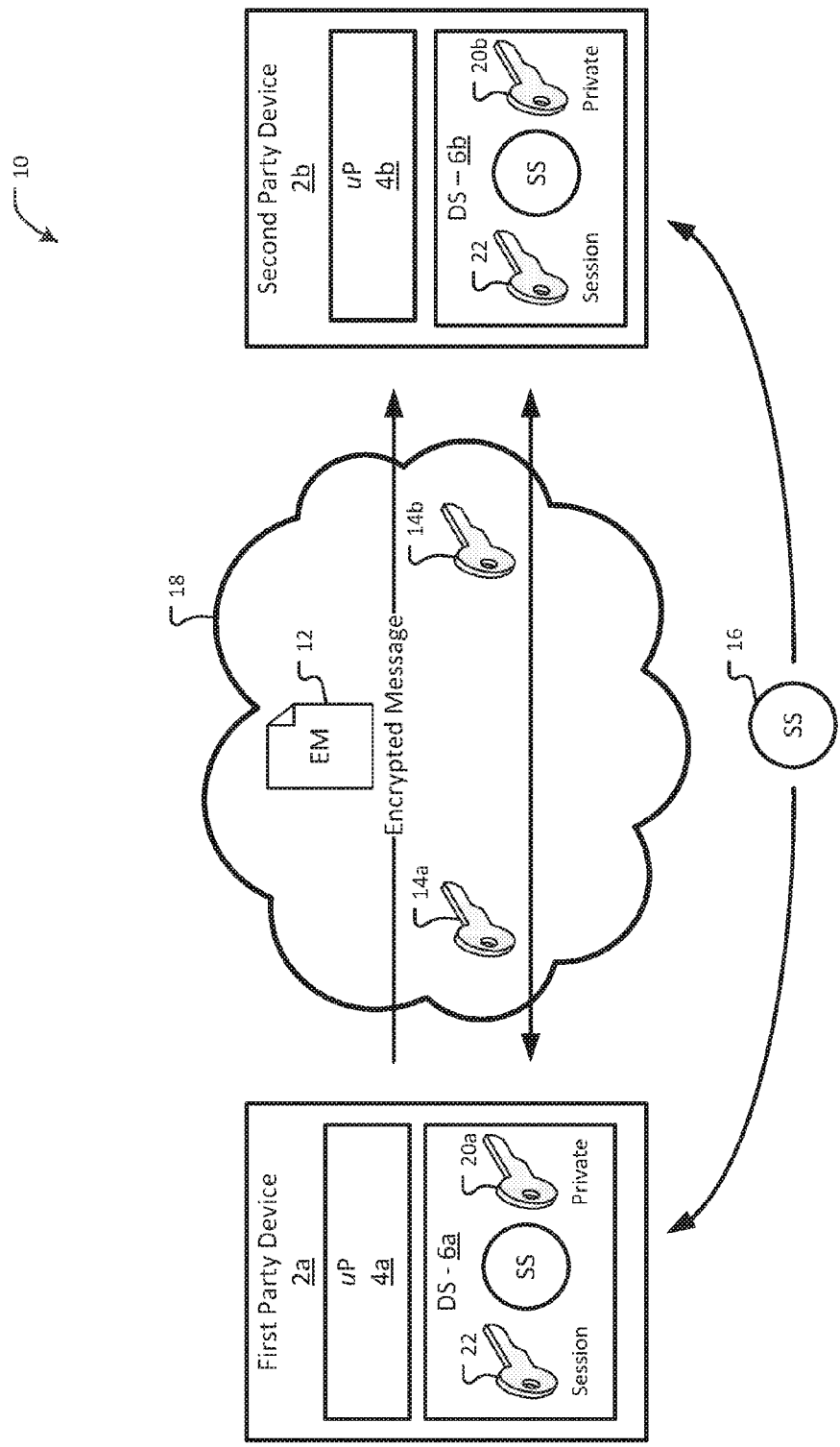
FIG. 1 is a diagram showing one example of an environment for encrypted communications.

FIG. 1 is a diagram showing one example of an environment 10 for encrypted communications. The environment 10 comprises a first computing device 2a and a second computing device 2b. The first computing device 2a and second computing device 2b may comprise respective microprocessors or processors 4a, 4a and data storage devices 6a, 6b. Data storage devices 6a, 6b may include any suitable device for storing data including, for example, random access memory (RAM). In some examples, in addition to or instead of RAM, data storage devices 6a, 6b may also include non-volatile devices such as, for example, hard disk drives, solid state drives, etc. Processors 4a, 4b may include any suitable type of processor. For example, processors 4a, 4b, may be in communication with the respective data storage devices 6a, 6b to receive instructions. The processors 4a, 4b may execute the instructions to implement the encryption systems and methods described herein. The first computing device 2a and the second computing device 2b may be in communication with one another via a network 18. The network 18 may be or comprise any sort of wired, wireless or mixed communication network. In some examples, the network 18 may be and/or comprise the Internet. Also, in some examples, the network 18 may be or comprise a connection utilizing a short range wireless protocol such as near field communications (NFC), Bluetooth™, Bluetooth LE™, etc.

In FIG. 1, the first computing device 2a may send an encrypted message 12 to the second computing device 2b via the network 18. The encrypted message 12 may be encrypted with a session key 22. The session key 22 may be determined and applied according to any suitable symmetric encryption technique including, for example, elliptic curve techniques. The session key 22 may be determined by the first computing device 2a and then derived by the second computing device 2b, for example, as described herein. For example, each computing device 2a, 2b may generate a public/private key pair 14a/20a, 14b/20b. As described herein, the computer device 2b may generate its public/private key pair 14b/20b based at least in part on public key 14a generated by the computing device 2a, for example, as described herein. Private keys 20a, 20b may be stored at the respective data storage devices 6a, 6b of the computing devices 2a, 2b and may not be shared. The computing devices 2a, 2b may exchange public keys 14a, 14b with one another as shown. Additionally, both of the computing devices 2a, 2b may possess a shared secret 16 (for example, stored at the respective data storage devices 6a, 6b). The shared secret 16 may be a number (e.g., an integer) that is known to the first and second computing devices 2a, 2b and is used to authenticate the computing devices 2a, 2b to one another. The first and second computing devices 2a, 2b may learn the shared secret 16 in any suitable manner. For example, users (not shown) of the computing devices 2a, 2b may exchange a physical representation of the shared secret that may be entered into the computing devices 2a, 2b. In some examples, the shared secret 16 may be stored on a portable data storage device such as a Universal Serial Bus (USB) drive (not shown) that may be physically connected to both of the computing devices 2a, 2b. In some examples, the shared secret 16 may be sent via a separate encrypted channel, although any other suitable transmission technique may be used to provide the shared secret to the computing devices 2a, 2b.

Figure 2:
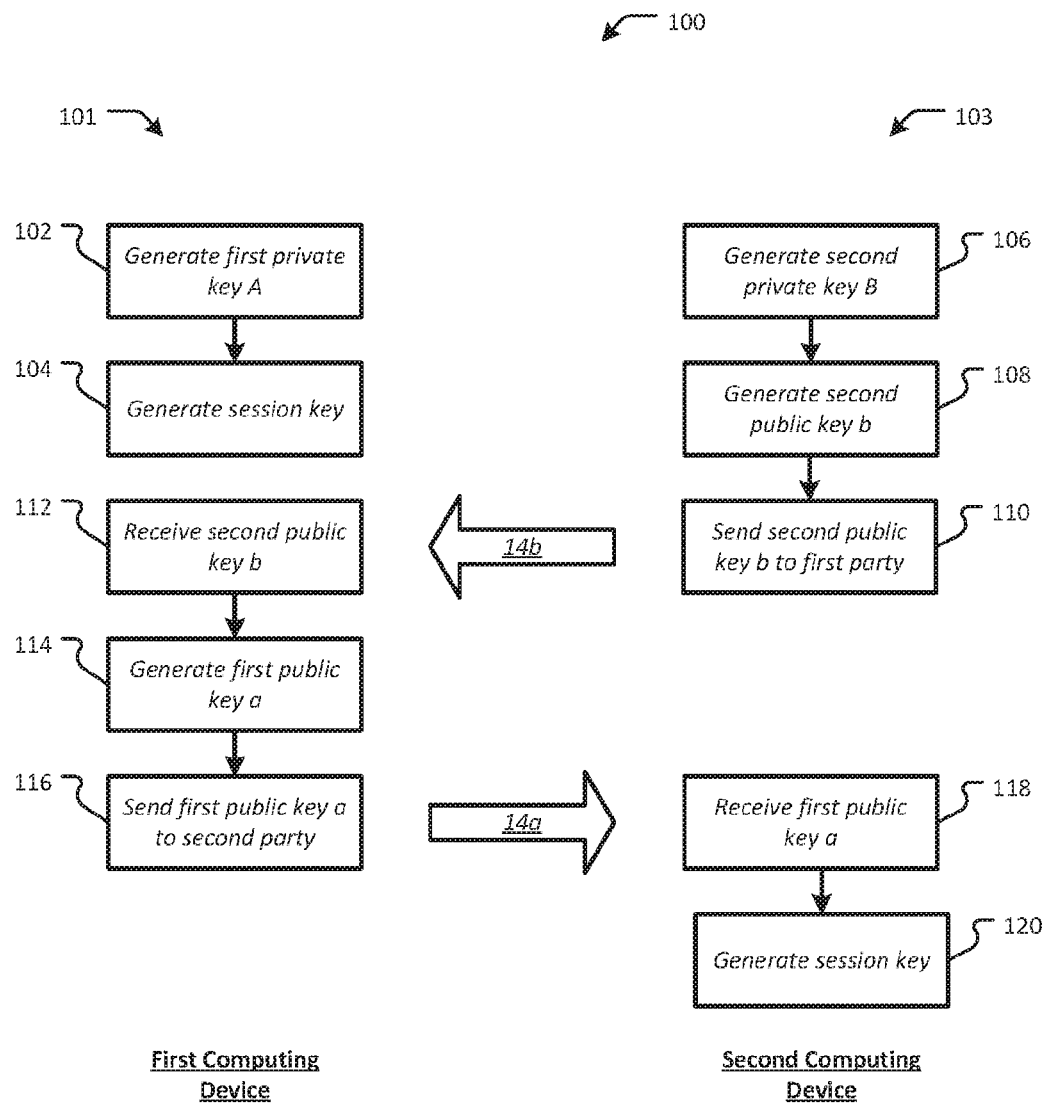
FIG. 2 is a flow chart showing one example of a process flow that may be executed by the first computing device and the second computing device to execute a public key encryption transaction.

FIG. 2 is a flow chart showing one example of a process flow 100 that may be executed by the first computing device 2a and the second computing device 2b to execute a public key encryption transaction. The flow chart of FIG. 2 comprises two columns 101, 103. Column 101 includes actions that may be performed by the first computing device 2a while column 103 includes actions that may be performed by the second computing device 2b.

At 102, the first computing device 2a may generate the first private key 20a. For example, the first private key 20a may be a randomly selected integer modulo p, meaning that the first private key 20a may be an integer that is between zero and a prime bounding integer p. Any suitable value may be selected for the prime bounding integer p. In some examples, the prime bounding integer p may be prime number. In some examples, the integer p may be a safe prime number (e.g., a prime number of the form 2x+1, where x is also prime). At 104, the computing device 2a may generate the session key. For example, the computing device 2a may generate the session key 22 based at least in part on a generator g and the first private key 20a.

Referring now to the column 103, the second computing device 2b may generate a second private key 20b at 106. Like the first private key 20a, the second private key 20b may be a randomly selected integer modulo p. At 108, the second computing device 2b may generate a second public key 14b. For example, the second public key 14b may be generated based at least in part on the shared secret 16 and the second private key 20b. In various examples, actions 106 and 108 may be performed before, after, or concurrent with the actions 102 and 104 described above. At 110, the second computing device may send the second public key 14b to the first computing device 2a, which may receive the second public key 14b at 112. At 114, the first computing device 2a may generate the first public key 14a. For example, the first computing device 2a may generate the first public key 14a based at least in part on the second public key 14b, the shared secret 16 and the first private key 20a. At 116, the first computing device 2a may send the first public key 14a to the second computing device 2b, which may receive the first public key 14a at 118. At 120, the second computing device 2b may generate the session key. For example, the second computing device 2b may generate the session key based on the second private key 20b, the shared secret 16 and the first public key 14a.

As illustrated by the process flow 100, the public keys 14a, 14b and the session key are generated utilizing the shared secret 16. In various examples, this may decrease vulnerability of the process flow 100 to man-in-the-middle attacks, as described herein. Also, as shown by the process flow 100, the first computing device 2a generates the session key at 104 before it receives any messages from the second computing device 2b. As a result, in some examples, the first computing device 2a may encrypt messages for the second computing device 2b before it receives the second public key 14b from the second computing device 2b. In some examples, the first computing device 2a may send encrypted messages to the second computing device 2b before the first computing device 2a receives the second public key 14b from the second computing device.

TABLE 1 below shows another example of a process flow that may be executed by the first computing device 2a and the second computing device 2b to execute a public key encryption transaction. For example, TABLE 1 illustrates various example equations for finding the private keys 20a, 20b, public keys 14a, 14b and the session key. TABLE 1 includes a column 201 showing actions performed by the first computing device 2a and a column 203 showing actions performed by the second computing device 2b.

TABLE 1

| Action | First Computing Device 2a (Column 201) | Second Computing Device 2b (Column 203) |
|---|---|---|
| | Shared Secret: S | |
| | Parameters: p, g, m $\in_R \mathbb{Z}_P$, n $\in_R \mathbb{Z}_P$ | |
| 202 | A $\in_R \mathbb{Z}_P$ | |
| 204 | K = $g^A$ | |
| 206 | | B $\in_R \mathbb{Z}_P$ |
| 208 | | b = $m^S g^B$ |
| 210 | ← b | |
| 212 | a = $(b \div m^S)^A n^S$ | |
| 214 | a → | |
| 216 | | K = $g^A$ = $(a \div n^S)^{B^{-1}}$ |

In TABLE 1, the shared secret 16 is noted by the letter S. The first private key 20a is noted by A. The second private key 20b is noted by B. The first public key 14a is noted by a. The second public key 14b is noted by b. The session key is noted by K. Further, TABLE 1 indicates various input parameters. The prime bounding integer is indicated by p. A generator is indicated by g. Two group constants m and n are also indicated. Like the private keys 20a, 20b described above, the first group constant m and the second group constant n may be random integers modulo p, indicated by Equations [1] and [2] below:

$$m \in_R \mathbb{Z}_P \quad [1]$$

$$n \in_R \mathbb{Z}_P \quad [2]$$

Input parameters such as the shared secret S, the prime bounding integer p, the generator g, and the group constants m and n may be known to both computing devices 2a, 2b before the transaction shown in TABLE 1 begins. For example, the shared secret S may be exchanged between the computing devices 2a, 2b as described herein. The generator g, the prime bounding integer p may be parameters of the function used to generate the session key K. For example, when the function is an elliptic curve, such as the P-256 curve, the values for p, and g may be selected to correspond to the selected elliptic curve. The group constants m and n, may take any suitable values commonly known to the computing devices 2a, 2b. For example, m, and n may be determined by the creators of an application, by a standards body, etc.

At 202, the first computing device 2a may generate the first private key, noted as A in TABLE 1. Similar to above, the first private key A may be a random integer modulo p. At 204, the first computing device 2a may generate the session key, noted as K in TABLE 1. In some examples, the first computing device 2a may generate the session key K according to Equation [3] below:

$$K=g^A \qquad [3]$$

In examples utilizing the Equation [3], the first computing device 2a may derive the session key K by raising the generator (g) to the first private key A. This result may be and/or be proportional to the session key K.

At 206, the second computing device 2b may find the second private key, noted as B in TABLE 1. Again similar to above, the second private key B may be a random integer modulo p. At 208, the second computing device 2b may generate the second public key, noted as b in TABLE 1. In some examples, the second computing device 2b may generate the second public key b according to Equation [4] below:

$$b=m^S g^B \qquad [4]$$

For example, the second computing device 2b may raise the first group constant m to the shared secret S to generate a first intermediate value. The second computing device may also raise the generator g to the second private key B to generate a second intermediate value. Multiplying the first intermediate value and the second intermediate value may provide the second public key b, as indicated. At 210, the second computing device 2b may send the second public key b to the first computing device 2a.

At 212, the first computing device 2a may generate the first public key 14a. For example, the first computing device 2a may generate the first public key 14a after having received the second public key b from the second computing device 2b. In some examples, the first computing device 2a may generate the first public key a according to Equation [5] below:

$$a=(b \div m^S)^A n^S \qquad [5]$$

For example, the first computer device 2a may raise the first group constant m to the shared secret S to generate an intermediate value. The first computer device 2a may divide the second public key b by intermediate value to generate a second intermediate value. The first computer device 2a may raise the second intermediate value to the first private key A to generate a third intermediate value. The first computer device 2a may raise the second group constant n to the shared secret S to generate a fourth intermediate value. The first public key a may be found by multiplying the third intermediate value and the fourth intermediate value.

At 214, the first computing device may send the first public key a, found at 212, to the second computing device 2b. At 216, the second computing device 2b may use the first public key a to generate the session key K. In some examples, the second computing device 2b may generate the session key K according to Equation [6] below:

$$K=(a \div n^S)^{B^{-1}} \qquad [6]$$

For example, the second computer device 2b may raise the second group constant n to the shared secret S to generate an intermediate value. The second computer device 2b may divide the first public key a by the intermediate value to find a second intermediate value. The second computer device 2b may raise the second intermediate value to the group inverse of the second private key B to generate the session key K. In some examples, Equation [6] may be equivalent to Equation [3], as indicated by Equation [7] below:

$$K=g^A=(a \div n^S)^{B^{-1}} \qquad [7]$$

Accordingly, the first computing device 2a may generate the session key K without the second private key B of the second computing device 2b. Similarly, the second computing device 2b may generate the same session key K without the first private key A of the first computing device 2a.

Figure 3:
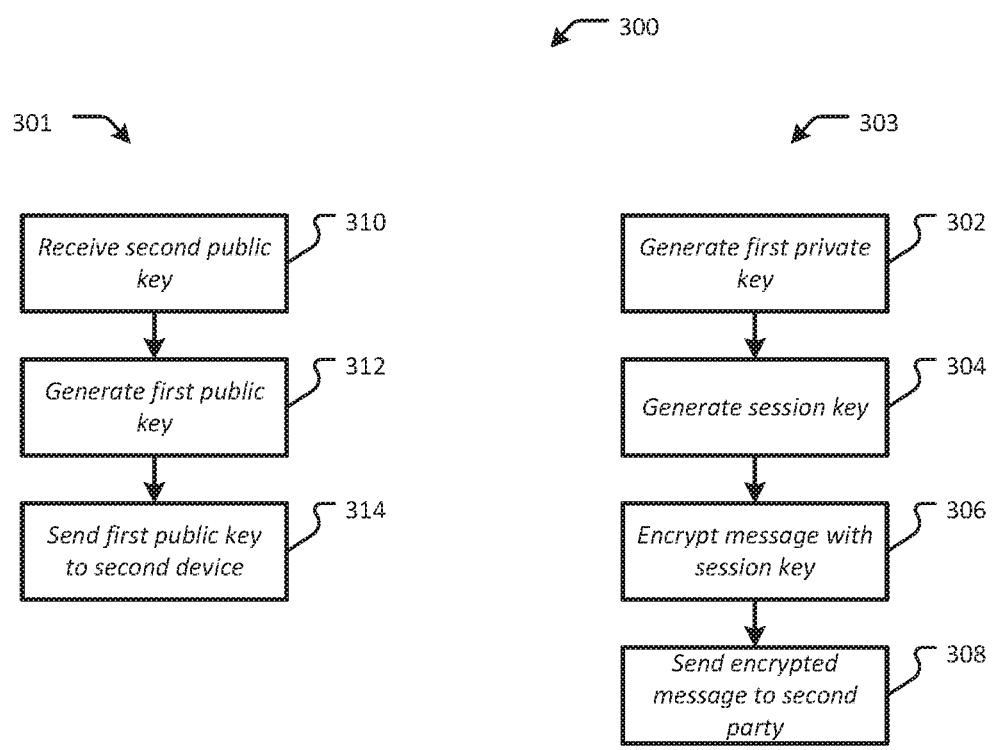
FIG. 3 is a flow chart showing one example of process flow that may be executed by the first computing device to send an encrypted message to the second computing device using the public key encryption transaction of FIG. 2.

FIG. 3 is a flow chart showing one example of process flow 300 that may be executed by the first computing device 2a to send an encrypted message to the second computing device 2b using the public key encryption transaction of FIG. 2. The process flow 300 comprises two columns 301, 303. Each column 301, 303 includes actions that may be performed in a particular order relative to one another. For example, the actions 310, 312, 314 of column 301 may be performed in ascending numerical order. Similarly, the actions 302, 304, 306, 308 of column 303 may be performed in ascending numerical order. The actions of column 301, however, need not be performed in any particular order relative to the actions of 303, except as described herein. In some examples, action 302 occurs before action 304 and before action 312.

Referring to column 303, the first computing device 2a may generate a first private key 20a, for example, as described above with respect to 102 and 202. At 304, the first computing device 2a may generate the session key 22, for example, as described above with respect to 104 and 204. At 306, the first computing device 2a may encrypt a first message using the session key 22 (e.g., generating the encrypted message 12). At 308, the first computing device 2a may send the encrypted message 12 to the second computing device 2b.

Referring to column 301, the actions 310, 312, 314 may be performed at any time relative to the actions of column 303. In various examples, however, the actions of column 303 may be performed before the second computing device 2b will be capable of decrypting the encrypted message. At 310, the first computing device 2a may receive from the second computing device 2b the second public key 14b. At 312, the first computing device 2a may generate the first public key 14a, for example, as described about at 114 and 212. At 314, the first computing device 2a may send the first public key 14a (generated at 312) to the second computing device 2b. The second computing device 2b may use the first public key 14a to generate the session key 22 for decrypting the encrypted message 12, as described herein.

Figure 4:
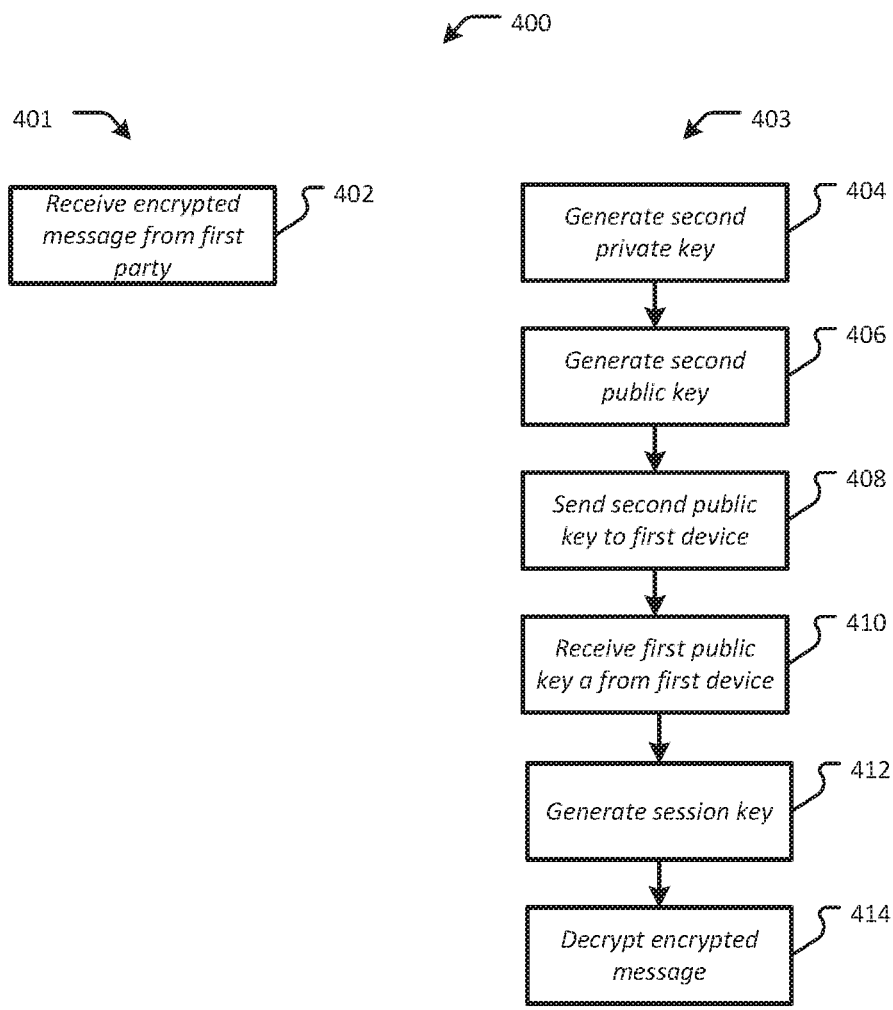
FIG. 4 is a flow chart showing one example of process flow that may be executed by the second computing device to receive and decrypt an encrypted message received from the first computing device using the public key encryption transaction of FIG. 2.

FIG. 4 is a flow chart showing one example of process flow 400 that may be executed by the second computing device 2b to receive and decrypt an encrypted message received from the first computing device 2a. Like the process flow 300, the process flow 400 comprises two columns 401, 403. Each column includes actions that may be performed in a particular order relative to one another. Actions in different columns may be performed in any order relative to each other. For example, at 402, the second computing device 2b may receive the encrypted message 12 from the first computing device 2a. The encrypted message 12 may be encrypted utilizing the session key 22. The encrypted message 12 may be received at any time prior to decrypting the encrypted message at 414. In some examples, action 402 may occur before action 414.

Referring to the column 403, at 404, the second computer device 2b may generate the second private key 20b, for example, as described herein at 106 and 206. At 406, the second computer device 2b may generate the second public key 14b, for example, as described herein at 108 and 208. At 408, the first computing device may send the second public key 14b to the first computing device 2a. The first computing device 2a may utilize the second public key 14b to generate the first public key 14a, as described herein. At 410, the second computing device 2b may receive the first public key 14a from the first computing device 2a. At 412, the second computing device 2b may generate the session key 22, for example, as described herein at 120 and 216. At 414, the second computing device 2b may decrypt the encrypted message 12 to reveal the information contained there. In various examples, the second computing device 2b may also encrypt a second message using the session key 22, generating a second encrypted message. The second encrypted message may be sent to the first computing device 2a. Because the first computing device 2a may have previously generated the session key 22, it may decrypt the second encrypted message utilizing the session key.

Reference in the specification to, "examples," "various examples," "some examples," etc. means that a particular feature, structure, or characteristic described in connection with the example embodiments is included in at least one embodiment of the invention. The appearances of the above-referenced phrases in various places in the specification are not necessarily all referring to the same embodiment. Reference to embodiments is intended to disclose examples, rather than limit the claimed invention. While the invention has been particularly shown and described with reference to several embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

In some examples of the present methods and systems disclosed herein, a single component can be replaced by multiple components, and multiple components replaced by a single component, to perform a given command or commands. Except where such substitution would not be operative to practice the present methods and systems, such substitution is within the scope of the present disclosure. Examples presented herein, including operational examples, are intended to illustrate potential implementations of the present method and system examples. Such examples are intended primarily for purposes of illustration. No particular aspect or aspects of the example method, product, computer-readable media, and/or system examples described herein are intended to limit the scope of the present disclosure.

The various components of the environment 10 may be and/or are executed by any suitable type of computing device including, for example, desktop computers, laptop computers, mobile phones, palmtop computers, personal data assistants (PDAs), etc. As used herein, a "computer," "computer system," "computing device," or "computing device," "machine," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing, and/or communicating data. Such memory can be internal, external, remote, or local with respect to its operatively associated computer or computer system. Memory may also include any means for storing software or other instructions including, for example and without limitation, a hard disk, an optical disk, floppy disk, ROM (read-only memory), RAM (random-access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of a method. It should be noted that the process steps and instructions of the present disclosure can be embodied in software, firmware, or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random-access memories (RAMs), electrically-programmable read-only memories (EPROMs), electrically erasable programmable read-only memories (EEPROMs), magnetic or optical cards, application-specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a particular programming language, the present disclosure is not limited to any particular programming language. A variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

What is claimed is:

1. A method for exchanging encrypted information between a first computing device and a second computing device comprising:
   both computing devices having input parameters including: a shared secret, a prime bounding integer, a generator, a first group constant, and a second group constant, wherein the input parameters are respectively used to generate a first private key, a second private key, a first public key, and a second public key;
   the second computing device receiving an encrypted message from the first computing device;
   the second computing device generating the second private key;
   the second computing device generating the second public key, using the generator, the shared secret, the first group constant, and the second private key;
   the second computing device sending the second public key to the first computing device;
   the first computing device using the second public key from the second computing device, the first group constant, the shared secret, the first private key, and the second constant to generate the first public key;
   the second computing device receiving the first public key from the first computing device;
   the second computing device using the first public key, the shared secret, the second group constant, and the second private key to calculate a session key; and
   the second computing device decrypting the encrypted message with the session key.

2. The method of claim 1, further comprising the first computing device raising the generator by the first private key to generate the session key.

3. The method of claim 1, further comprising the first computing device encrypting the message using the session key.

4. The method of claim 3, further comprising the first computing device sending the encrypted message, which is received by the second computing device before the second computing device calculates the session key.

5. The method of claim 4, wherein the second computing device decrypts the encrypted message after calculating the session key.

6. The method of claim 1, wherein the second computing device is configured to:
   raise the first group constant to the shared secret to generate a first intermediate value;
   raise the generator to the second private key to generate a second intermediate value; and
   multiple the first intermediate value by the second intermediate value to generate the second public key.

7. The method of claim 1, wherein the second computing device is configured to:
   raise the second group constant by the shared secret integer to generate a first intermediate value;
   divide the first public key by the first intermediate value to generate a second intermediate value; and
   raise the second intermediate value to an inverse of the second private key to generate the session key.

8. The method of claim 1, wherein the second computing device is configured to:
   encrypt a second message using the session key to generate a second encrypted message; and
   send the second encrypted message to the first computing device.

9. The method of claim 1, wherein the first computing device is configured to:
   raise the first group constant to the shared secret to generate a first intermediate value;
   divide second public key by the first intermediate value to generate a second intermediate value;
   raise the second intermediate value to the first private key to generate a third intermediate value;
   raise the second group constant to the shared secret integer to generate a fourth intermediate value; and
   multiply the third intermediate value and the fourth intermediate value to generate the first shared key.

10. The method of claim 1, wherein the first computing device and the second computing device communicate with each other via a network.

11. The method of claim 1, wherein the first computing device selects an integer greater than one and less than the prime bounding integer as the first private key.

12. A system comprising:
a computing device configured to exchange encrypted information with another computing device, wherein both computing devices have input parameters including: a shared secret, a prime bounding integer, a generator, a first group constant, and a second group constant, wherein the input parameters are respectively used to generate a first private key, a second private key, a first public key, and a second public key, and the computing device is configured to:
receive an encrypted message from the other computing device;
generate the second private key;
generate the second public key, using the generator, the shared secret, the first group constant, and the second private key;
send the second public key to the other computing device, wherein the other computing device uses the second public key from the computing device, the first group constant, the shared secret, the first private key, and the second constant to generate the first public key;
receive the first public key from the other computing device;
use the first public key, the shared secret, the second group constant, and the second private key to calculate a session key; and
decrypt the encrypted message with the session key.

13. The system of claim 12, wherein the other computing device raises the generator by the first private key to generate the session key.

14. The system of claim 12, wherein the encrypted message received from the other computing device was encrypted using the session key, the other computing device sends the encrypted message, which is received before the computing device generates the session key, and the computing device decrypts the encrypted message after calculating the session key.

15. The system of claim 12, wherein the computing device is configured to:
raise the first group constant to the shared secret to generate a first intermediate value;
raise the generator to the second private key to generate a second intermediate value; and
multiple the first intermediate value by the second intermediate value to generate the second public key.

16. The system of claim 12, wherein the computing device is configured to:
raise the second group constant by the shared secret integer to generate a first intermediate value;
divide the first public key by the first intermediate value to generate a second intermediate value; and
raise the second intermediate value to an inverse of the second private key to generate the session key.

17. The system of claim 12, wherein the computing device is configured to:
encrypt a second message using the session key to generate a second encrypted message; and
send the second encrypted message to the other computing device.

18. The system of claim 12, wherein the other computing device is configured to:
raise the first group constant to the shared secret to generate a first intermediate value;
divide second public key by the first intermediate value to generate a second intermediate value;
raise the second intermediate value to the first private key to generate a third intermediate value;
raise the second group constant to the shared secret integer to generate a fourth intermediate value; and
multiply the third intermediate value and the fourth intermediate value to generate the first shared key.

19. The system of claim 12, further comprising the other computing device.

20. A non-transitory computer readable storage medium storing instructions, which when executed, cause a computing device to exchange encrypted information with another computing device, wherein both computing devices have input parameters including: a shared secret, a prime bounding integer, a generator, a first group constant, and a second group constant, wherein the input parameters are respectively used to generate a first private key, a second private key, a first public key, and a second public key, and the computing device is configured to:
receive an encrypted message from the other computing device;
generate the second private key;
generate the second public key, using the generator, the shared secret, the first group constant, and the second private key;
send the second public key to the other computing device, wherein the other computing device uses the second public key from the computing device, the first group constant, the shared secret, the first private key, and the second constant to generate the first public key;
receive the first public key from the other computing device;
use the first public key, the shared secret, the second group constant, and the second private key to calculate a session key; and
decrypt the encrypted message with the session key.

* * * * *